March 9, 1954

J. A. LOGAN ET AL 2,671,503

CONTROL APPARATUS FOR AUXILIARY DRAFT
FLUID-FUEL-FIRED HEATING APPARATUS

Filed Dec. 8, 1951

INVENTORS
JOSEPH A. LOGAN AND
JAMES ALAN MAC DONNELL
BY Chapin & Neal
ATTORNEYS

March 9, 1954

J. A. LOGAN ET AL 2,671,503

CONTROL APPARATUS FOR AUXILIARY DRAFT
FLUID-FUEL-FIRED HEATING APPARATUS

Filed Dec. 8, 1951

INVENTORS
JOSEPH A. LOGAN AND
JAMES ALAN MAC DONNELL
BY Chapin & Neal
ATTORNEYS

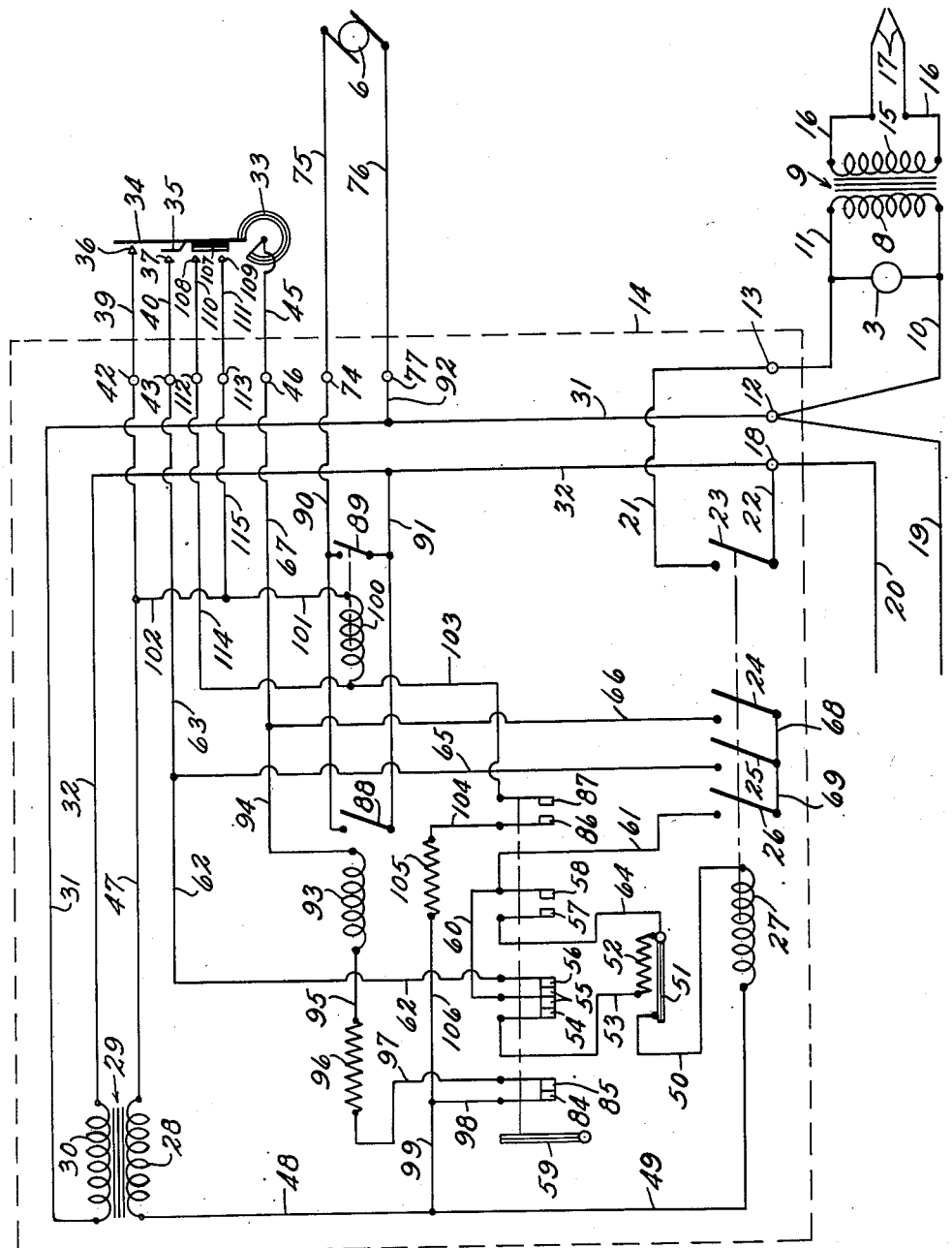

Patented Mar. 9, 1954

2,671,503

UNITED STATES PATENT OFFICE 2,671,503

CONTROL APPARATUS FOR AUXILIARY DRAFT FLUID-FUEL-FIRED HEATING APPARATUS

Joseph A. Logan, Hadley, and James Alan MacDonnell, Longmeadow, Mass., assignors to Gilbert & Barker Manufacturing Company, West Springfield, Mass., a corporation of Massachusetts Application December 8, 1951, Serial No. 260,629

5 Claims. (Cl. 158—28)

1

This invention relates to a control apparatus adapted for use with fluid-fuel burners, such as those adapted for house-heating service, to coordinate with the burner operation a fan which is adapted to blow air into the stack of the heating apparatus fired by the burner and create a draft through such apparatus to improve the operation of the burner.

The invention has for an object the provision of a control apparatus which will function, on a demand for heat from the burner, to start the fan shortly before the burner for the purpose of creating a draft and inducing a flow of air through the burner and into and through the combustion chamber of the heating apparatus, and to continue the fan in operation at least until the burner starts and preferably for a short period thereafter in order to increase the air supply during the starting period of operation of the burner.

The invention also has for an object the provision of a control apparatus which will function, when the demand for heat from the burner is nearly satisfied, to start the fan before the burner stops in order to increase the air supply to the burner during its stopping period of operation and to continue the fan in operation at least until the burner stops and preferably for a brief interval thereafter in order to scavenge the combustion chamber.

Preferably, both of the described control apparatus are used together in order to operate the fan near the start of a run of the burner and also near the end of such run but either control apparatus may be used separately with some advantage.

The invention will be disclosed with reference to the illustrative examples of it shown in the accompanying drawings, in which:

Fig. 2 is a wiring diagram illustrating one form of control apparatus for operating the auxiliary fan both near the start and near the stop of the burner;

Fig. 3 is a wiring diagram of another form of control apparatus for operating the auxiliary fan both near the start and near the stop of each run of the burner and which provides for longer intervals during which both the burner fan and the auxiliary fan operate.

Figure 1:
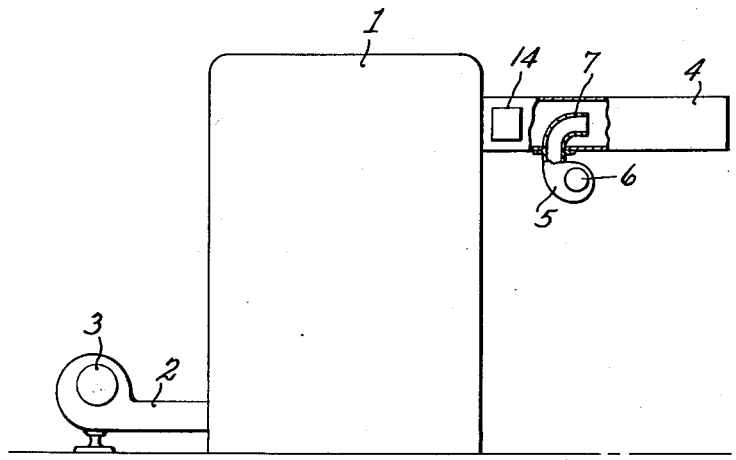
Fig. 1 is a small-scale elevational view of a heating apparatus, fired by an electric-motor-driven oil burner and having an auxiliary electric-motor-driven fan arranged to blow air into the stack of the heating apparatus.

Referring to these drawings; there is shown conventionally in Fig. 1 a heating apparatus 1, fired by a fluid-fuel burner 2, such as an oil burner, having suitable fuel and air supply means, such for example as an oil pump and air fan, both actuated by an electric motor 3. The stack of the heating apparatus is shown at 4. An auxiliary fan 5, driven by an electric motor 6, is adapted to deliver air through its outlet conduit 7 into the stack 4, and preferably, as shown, in the direction of travel of the gases through the stack. It is desired to operate this auxiliary fan in advance of the burner, each time there is a demand for heat in order to establish a draft, and to maintain it in operation until the burner starts and preferably for a short time thereafter. It is also desired to again start the auxiliary fan, in advance of the stopping of the burner, and to maintain it in operation until the burner stops and preferably for a short interval after the burner stops.

In Fig. 2 there is shown diagrammatically one form of control apparatus for coordinating the operation of the auxiliary fan 5 with that of the burner. That part of the control apparatus, which has to do with the operation of the burner and its ignition means, is of old and well known form and has been illustrated to show how the auxiliary fan control may be combined with a standard burner control by a few additions and changes in order to coordinate the operation of the auxiliary fan control with that of the burner in the desired manner.

The burner control will be described first. The burner motor 3 and the primary 8 of a transformer 9 are connected in parallel by wires 10 and 11, which are respectively connected to terminals 12 and 13 on a member 14 that supports the various parts of the control apparatus. The secondary 15 of transformer 9 is connected by wires 16 to the ignition electrodes 17 of the burner. The terminal 12 and another terminal 18 on member 14 are adapted for connection to a suitable source of electricity, such for example as a 110 volt 60 cycle alternating current supply, as by the wires 19 and 20. The terminals 13 and 18 are respectively connected by wires 21 and 22 to the terminals of a switch 23, which is adapted to complete the energizing circuit for the burner, starting the burner motor 3 and energizing the ignition means described. The burner energizing circuit may be traced as follows, wire 19, terminal 12, wire 10, motor 3 and primary 8, wire 11, terminal 13, wire 21, switch 23, wire 22, terminal 18 and wire 20. The switch 23 is actuated by electrically-operated means, as by a relay coil 27, together with three other switches 24, 25 and 26. All four switches open and close simultaneously when coil 27 is respectively energized and deenergized. The relay coil 27 is included in a low voltage control circuit, supplied from a suitable power source, such as the secondary 28 of a transformer 29, which is mounted on member 14 and the primary 30 of which is connected by wires 31 and 32 to the power terminals 12 and 18, respectively.

This low voltage control circuit is adapted to be controlled by some means, which is indicative of the need for burner operation, such for example, as a thermostat which is responsive to the temperature in the space to be heated by the heating apparatus 1. Such a thermostat is indicated at 33 as a bi-metallic member to which are fixed switch blades 34 and 35 movable in relation to fixed contacts 36 and 37, respectively. The blades 34 and 35 are moved toward their respective contacts on falling temperature and away from such contacts on rising temperature. The blade 34 engages its contact 36 at some suitable selected temperature, such for example as 70°, and the blade 35 engages its contact 37 at a fractionally lower temperature and thus at a later time. It is customary to make these contacts adjustable and the temperature at which the blades engage their contacts may be varied within a reasonable range as desired. The interval between the engagement of contact 36 by blade 34 and the engagement of contact 37 by blade 35 may be varied by relative adjustment of the contacts. When the need for burner operation is nearly satisfied, as indicated by rising temperature, the thermostat 33 moves blade 35 out of engagement with contact 37 and this occurs before the blade 34 leaves contact 36, which occurs only when the need for burner operation is fully satisfied. A delay of from one to five minutes in the engagement of blade 35 with contact 37 after the engagement of blade 34 with contact 36 can be readily secured in this way, the time interval being variable of course according to the rate at which the room temperature changes, but ample time for the purpose may be had in this way. For the purpose of controlling the auxiliary fan 5 a third fixed contact 38 has been added to the thermostat switch and this contact will be engaged by the blade 35 at the same time that the latter engages contact 37.

These contacts 36, 37 and 38 are adapted to be connected, as by wires 39, 40 and 41, to terminals 42, 43 and 44 on member 14. The blade-moving member 33 is adapted to be connected, as by a wire 45, to a terminal 46 on member 14. The terminal 42 is connected by a wire 47 to one terminal of secondary 28 and the other terminal of the latter is connected by wires 48 and 49 to one terminal of relay coil 27. The other terminal of the latter is connected by a wire 50 to one terminal of thermal time switch, having a bi-metallic blade 51. The other terminal of this switch is connected to one terminal of the electric heating coil 52, which when energized heats the switch blade 51 and causes it to open in a predetermined time, say for example 90 seconds. The other terminal of coil 52 is connected by a wire 53 to a contact 54 of a combustion-responsive switch. The latter also includes a pair of contacts 55 electrically connected together and contacts 56, 57 and 58. This switch is thermally-actuated as by a combustion-responsive member, such for example as a bi-metallic thermostat 59, located to respond to heat produced by the burner. This thermostat may be supported by the member 14 and the latter may be mounted on the stack 4 in the usual manner, as indicated in Fig. 1, so that the sensitive part of the thermostat 59 is located in the stack to respond to the heat of the gases therein. Thermostat 59, when the burner is not in operation and the stack is cool, maintains the contacts 54, 55 and 56 engaged and the contacts 57 and 58 separated, all as shown. When combustion occurs the thermostat 59 moves contacts 57 and 58 into engagement, then separates contact 56 from the contact 55 that it engages, and finally separates the contact 54 from the other contact 55. These contacts 55 are connected by a wire 60 to contact 58 and the latter is connected by a wire 61 to the contact of switch 26. The contact 56 is connected by wires 62 and 63 to terminal 43. The contact 57 is connected by a wire 64 to switch 51. The contact of switch 25 is connected by a wire 65 to wire 63. The contact of switch 24 is connected by wires 66 and 67 to terminal 46. The other terminals of the three switches 24, 25 and 26 are connected together by wires 68 and 69.

When a need for heat from the burner is indicated by movement of the room thermostat 33 to first carry the blade 34 into engagement with contact 36 at the selected temperature, and subsequently to carry the blade 35 into engagement with contact 37 a starting control circuit for relay 27 is closed. This cannot occur until both contacts 36 and 37 are engaged by their respective blades 34 and 35 because the switch 24 is open. This starting control circuit may be traced as follows, from the right hand terminal of secondary 28 by wire 47, terminal 42, wire 39, contact 36, blades 34 and 35, contact 37, wire 40, terminal 43, wires 63 and 62, engaged contacts 56, 55 and 54, wire 53, heating coil 52, switch 51, wire 50, relay coil 27, and wires 49 and 48 to the other terminal of secondary 28. The relay pulls in, simultaneously closing switches 23, 24, 25 and 26. The closing of switch 23 completes a circuit for the burner motor 3 and energizes its ignition means 9 causing the burner to start. The closing of switch 24 closes a branch path including wires 66, 67, terminal 46 and wire 45, through the thermostat blade 34 and this branch path later becomes part of the control circuits shortly before the burner stops. The closing of the switches 25 and 26 prepares the holding circuit for the relay coil 27 or the running control circuit, which excludes the heating coil 52 and is finally closed only if and when combustion occurs and time enough has elapsed for the contacts 57 and 58 to engage. This running circuit is the same as the starting control circuit through wire 63 and then extends by wire 65, closed switch 25, wire 69, closed switch 26, wire 61, contacts 57 and 58, wire 64, switch 51, wire 50, coil 27 and wires 49 and 48 to the left hand terminal of secondary 28. If combustion does not occur in a predetermined time, say 90 seconds, the switch 51 will be opened by the heat from coil 52 and the circuit to the relay 27 will be opened, causing the burner to stop. It is usual to arrange for switch 51 to be automatically held open until manually reset. If combustion occurs, the contacts 57 and 58 will engage and close the running control circuit for the burner. The heating coil 52 is first shunted out as described, and then its circuit is opened by the separation of contacts 56 and 55 and subsequently again by the separation of contacts 54 and 55.

When the need for burner operation is nearly satisfied, the thermostat 34 moves blade 35 out of engagement with contact 37 and changes the running control circuit to the stopping control circuit which includes the branch described through wire 45, terminal 46, wires 67 and 66, closed switch 24, wires 68 and 69, closed switch 26 and thence as formerly described for the running control circuit. Disengagement of blade 34 from contact 36 opens the stopping control circuit to relay coil 27, and the relay drops out, opening the burner switch 23 and the switches 24, 25 and 26, returning them all to their illustrated positions. The stack thermostat 59 cools, causing contacts 57 and 58 to separate and, after about a minute, causing the contacts 55 and 56 to engage, followed by the engagement of the contacts 54 and 55. The one minute interval provides a scavenging period preventing starting of the burner until the combustion chamber cools.

To control the auxiliary fan 5 a second electrically-operated switch means is provided, such as a relay comprising a coil 70 and a switch 71 and is mounted on member 14. The switch 71 is adapted to control an energizing circuit for the motor 6 of the auxiliary fan, such circuit comprising a wire 72 which connects power wire 32 to the switch; a wire 73, terminal 74 and wire 75 which connect the contact of switch 71 to one terminal of motor 6; and a wire 76, terminal 77 and wire 78, which connect the other terminal of motor 6. The relay coil 70 is adapted to the other power wire 31. One terminal of the relay coil 70 is connected by a wire 79 to wire 67 and thus to terminal 46, and its other terminal is connected by a wire 80 to one terminal of a resistor 81, the other terminal of which is connected by a wire 82 to wire 48. The last-named terminal of relay coil 70 is also connected by a wire 83 to terminal 44 and thus to the additional contact 38 which is adapted to be engaged by blade 35 simultaneously with contact 37. The engagement of the blade 34 with contact 36 closes an energizing circuit to the relay coil 70, which may be traced as follows, from the right hand terminal of secondary 28 by wire 47, terminal 42, wire 39, contact 36, blade 34, wire 45, terminal 46, wires 67 and 79, coil 70, wire 80, resistor 81, and wires 82 and 48 to the left hand terminal of secondary 28. The relay will pull in, closing switch 71 and starting the motor 6 of the auxiliary fan. The motor 6 will be stopped when the blade 35 engages contact 38 because this closes a circuit which shunts out the relay coil 70. This circuit may be traced as follows, from the right hand terminal of secondary 28 by wire 47, terminal 42, wire 39, contact 36, blades 34 and 35, contact 38, wire 41, terminal 44; wires 83 and 80, resistor 81, and wires 82 and 48 to the left hand terminal of the resistor. Thus, the fan motor 6 will be deenergized simultaneously with the energizing of the burner motor 3 and its ignition means but the fan 5 itself will continue to turn for awhile with the rotor of motor 3 by the momentum of the moving parts. Near the end of each run of the burner, when the blade 35 disengages from the contacts 37 and 38, the shunt around relay coil 70 will be broken and the relay will again pull in, thus starting the motor 6 of the auxiliary fan. The fan will operate until a brief interval after the burner stops. The fan motor is deenergized simultaneously with the burner motor when blade 34 disengages from contact 36 but the rotor of motor 6 and the fan will continue to turn by momentum. The oil flow to the burner is cut off soon after the circuit of the burner motor is opened by a decrease in speed of the burner motor and a substantial time before it stops.

A second form of control is shown in Fig. 3 and this form provides for longer periods of operation of the auxiliary fan after the burner is started and after it is stopped. The burner control is exactly the same as described in the first form of the invention and parts in Fig. 2 which correspond with parts in Fig. 3 have been given the same reference numerals. There has been added to the combustion responsive switch a pair of contacts 84 and 85, which are engaged when the thermostat 59 is cool and separate at about the same time as contacts 54 and 55 separate, say for example in about a minute after combustion occurs. There has also been added to the combustion responsive switch a pair of contacts 86 and 87 which are separated when thermostat 59 is cool and which engage at about the same time that the contacts 84 and 85 disengage and disengage at about the same time that the contacts 84 and 85 engage. The fan motor 6, as before, is connected by wires 75 and 76 to terminals 74 and 77 on member 14 but it is controlled by two relays, the switches 88 and 89 of which are connected in parallel by wires 90 and 91 that respectively connect with terminal 74 and power wire 32. The other power wire 31 is connected by a wire 92 to terminal 77. The closure of either switch 88 or 89 will close a circuit to the motor 6, such circuit extending from power terminal 18 by wires 32 and 91, the closed switch 88 or 89, as the case may be, wire 90, terminal 74, wire 75, motor 6, wire 76, terminal 77 and wires 92 and 31 to power terminal 12. The switch 88 is controlled by a coil 93, one terminal of which is connected by a wire 94 to wire 67 and thus to terminal 46. The other terminal of coil 93 is connected by a wire 95 to one terminal of a resistor 96, the other terminal of which is connected by a wire 97 to contact 85. Contact 84 is connected by wires 98 and 99 to wire 48. On a demand for heat, the room thermostat switch closes, its blade 34 engaging the contact 36. This closes a circuit to relay coil 93 causing switch 88 to close and start the motor 6 of the auxiliary fan. Such circuit may be traced as follows, from the right hand terminal of secondary 28 by wire 47, terminal 42, wire 39, contact 36, blade 34, wire 45, terminal 46, wires 67 and 94, coil 93, wire 95, resistor 96, wire 97, engaged contacts 85 and 84, and wires 98, 99 and 48 to the left hand terminal of secondary 28. The switch 88 will remain closed, while the burner is started and until after combustion occurs, when the contacts 84 and 85 separate. When the burner motor starts, by the pulling in of relay 27, the circuit of relay coil 93 will be changed extending from the right hand terminal of secondary 28 by wire 47, terminal 42, wire 39, contact 36, blade 34 and blade 35 to contact 37, which it then engages, and thence by wire 40, terminal 43, wires 63 and 65, closed switch 25, wire 68, closed switch 24, wires 66 and 94, coil 93, wire 95, resistor 96, wire 97, engaged contacts 85 and 84, and wires 98, 99 and 48, to the left hand terminal of secondary 28. The second switch 89 is actuated by a relay, which includes a coil 100. One terminal of this coil is connected by wires 101 and 102 to wire 47. The other terminal of coil 100 is connected by a wire 103 to contact 87. The contact 86 is connected by a wire 104 to one terminal of a resistor 105, the other terminal of which is connected by a wire 106 to wire 99. The thermostat blade 34 has fixed thereto and insulated therefrom a conducting plate 107 which is adapted to simultaneously engage two fixed contacts 108 and 109 at the same time that blade 35 engages contact 37. These contacts 108 and 109 are connected by wires 110 and 111 to terminals 112 and 133, respectively, on member 14. The terminal 112 is connected by a wire 114 to that terminal of coil 100 which is directly connected to wire 103. The terminal 113 is connected by a wire 115 to wire 101 and thus to the other terminal of coil 100. The energizing circuit for relay coil 100 may be traced as follows, from the right hand terminal of secondary 28 by wire 47 to wire 102, wires 102 and 101, coil 100, wire 103, contacts 87 and 86, wire 104, resistor 105 and wires 106, 99 and 48 to the left hand terminal of secondary 28. Initially this circuit is open because the contacts 86 and 87 are separated until combustion occurs. Prior to the occurrence of combustion, plate 107 engages contacts 112 and 113 and this closes a shunt around relay coil 100, preventing it from closing switch 89, when the contacts 86 and 87 engage following occurrence of combustion. The shunt circuit may be traced as follows, from the right hand terminal of secondary 28 by wire 47, to wire 102, wires 102 and 115, terminal 113, wire 111, contact 109, plate 107, contact 108, wire 110, terminal 112, wires 114 and 103, engaged contacts 87 and 86, wire 104, resistor 105 and wires 106, 99 and 48 to the left hand terminal of secondary 28. The relay coil 100 remains unenergized until the plate 107 is moved by thermostat blade 34 out of engagement with contacts 108 and 109, which breaks the shunt around the coil and enables it to be energized through the circuit first described and to close the switch 89 to start the motor 6. The motor continues to operate until combustion ceases and the stack 4 cools sufficiently to enable the thermostat 59 to separate the contacts 86 and 87. The opening of the room thermostat switch 33, by the disengagement of blade 34 from contact 36, does not deenergize relay coil 100 because the latter is connected to the power source by wires 47 and 102 and thus independently of the room thermostat switch.

Figure 4:
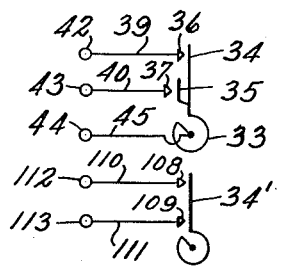
Fig. 4 is a fragmentary wiring diagram illustrative of a modification in the control apparatus shown in Fig. 3.

If desired, instead of adding the contacts 108 and 109 to the room thermostat switch to be engaged by a plate 107 on blade 34, these contacts may be arranged, as shown in the fragmentary diagram of Fig. 4, to be engaged by another bimetallic blade 34', which is like blade 34 and synchronized therewith so that it will engage the contacts 108 and 109 at the same time that blade 35 engages contact 37. This arrangement can be used with the control shown in Fig. 3 on member 14, the two thermostats being connected as indicated to terminals on the member.

The invention thus provides a control apparatus having one switch means for controlling an energizing circuit to an electrically-operated, fluid-fuel burner and its ignition means and a second switch means for controlling an electrically-operated auxiliary fan. This fan is adapted to be used with a heating apparatus to create a draft through the burner, which fires the apparatus, and through the combustion chamber and gas passages of the apparatus, preliminary to the starting of the burner in order to establish an adequate flow of air when the burner starts. The auxiliary fan is also adapted to function, when the burner is decelerating to a stop, for the purpose of compensating for the decreasing air flow from the usual burner fan and also for the purpose of scavenging the burner, and the combustion chamber and gas passages of the heating apparatus, after the burner stops. These switch means are actuated by the room thermostat 33, which is operable when the temperature falls to a predetermined value, to actuate the fan switch means to start the fan and later at a slightly lower temperature to actuate the burner switch means to start the burner. The fan switch means is actuated to stop the fan only when the burner switch means has been actuated to start the burner, which may be done, as shown in Fig. 2, by shunting out the relay coil 70 or, as shown in Fig. 3, by a thermal switch, such as the contacts 84, 85, which are actuated by the thermostat 59 in response to rising temperature in the heating apparatus, following combustion, to open the circuit to relay coil 93. In the Fig. 3 form, the switch means for the fan energizing circuit include the switches 88 and 89. The room thermostat 33 again actuates the fan switch means to start the fan, when the demand for heat is nearly satisfied, as indicated by the disengagement of blade 35 from its contacts, when the temperature rises to the first-named value, such disengagement opening the shunt around the coil 70 of Fig. 2 or the shunt around the coil 100 of Fig. 3, as the case may be, the fan continuing in action at least until the burner stops and preferably, as shown in Fig. 3, until a short time after combustion ceases, the burner thermostat 59 then separating the contacts 86 and 87 to break the circuit to coil 100.

Thus, we have provided a control apparatus for starting an auxiliary draft-creating fan ahead of the starting of the burner in order to insure an air stream moving at the proper rate to provide for good combustion, when the burner starts, and particularly during its period of acceleration before the burner fan reaches its full speed. Also, the control apparatus provides for again starting the auxiliary fan before the burner stops and particularly during its period of deceleration to compensate for the decrease in air supplied by the burner fan as it decelerates and also to scavenge the burner, together with the combustion chamber and gas passages of the heating apparatus.

What is claimed is:

1. A control apparatus for use with an electrically-operated fluid-fuel burner adapted to fire a space-heating apparatus and with an electrically-operated auxiliary fan for creating a draft through such apparatus, comprising, an energizing circuit for the burner, a switch in said circuit, means including a relay coil closing and opening said switch when energized and deenergized respectively, first and second thermostat switches responsive to the temperature in the space to be heated, the first thermostat switch respectively closing at and opening above a first predetermined temperature, the second thermostat switch respectively closing at and opening above a second and lower predetermined temperature, an energizing circuit for said relay coil including in series both said thermostat switches, whereby the closure of both thermostat switches is necessary to energize said relay coil and close the burner energizing circuit, a second switch closed and opened by said relay coil when energized and deenergized respectively connected in parallel with the second thermostat switch for maintaining the energizing circuit of such relay coil closed after the opening of the second thermostat switch and until the opening of the first thermostat switch, an energizing circuit for the fan, a switch in said last-named circuit, means including a second relay coil closing and opening said last-named switch when energized and deenergized respectively, a circuit including the last-named relay coil and said first thermostat switch for energizing the last-named relay coil on closure of the first-thermostat switch, and means operatively associated with the last-named circuit and including a switch actuated in response to a burner starting condition of the control apparatus to deenergize the second relay coil while the first thermostat switch is closed.

2. The combination, as claimed in claim 1, in which the means for deenergizing the second relay coil consists of a shunt circuit around such relay coil and the switch included by said last-named means is a switch actuated by and with the second thermostat switch to closed and open positions.

3. The combination, as claimed in claim 1, in which the means for deenergizing the second relay coil consists of a thermostat switch in the circuit of such relay coil and opening in response to occurrence of combustion at the burner.

4. A control apparatus for use with an electrically-operated fluid-fuel burner adapted to fire a space-heating apparatus and with an electrically-operated auxiliary fan for creating a draft through such apparatus, comprising, an energizing circuit for the burner, a switch in said circuit, means including a relay coil closing and opening said switch when energized and deenergized respectively, first and second thermostat switches responsive to the temperature in the space to be heated, the first thermostat switch respectively closing at and opening above a first predetermined temperature, the second thermostat switch respectively closing at and opening above a second and lower predetermined temperature, an energizing circuit for said relay coil including in series both said thermostat switches, whereby the closure of both thermostat switches is necessary to energize said relay coil and close the burner energizing circuit and initiate a cycle of operation of the burner, a second switch closed and opened by said relay coil when energized and deenergized respectively and connected in parallel with the second thermostat switch for maintaining the energizing circuit of said relay coil closed after the opening of the second thermostat switch and until the opening of the first thermostat switch, an energizing circuit for the fan, a switch in said last-named circuit, means including a second relay coil closing and opening said last-named switch when energized and deenergized respectively, an energizing circuit for the last-named relay coil, a third thermostat switch in the last-named circuit respectively closing and opening responsive to the presence or absence of combustion at the burner, a fourth thermostat switch closing and opening by and with the second thermostat switch, a shunt circuit including said fourth thermostat switch around the second relay coil for deenergizing the same when the fourth thermostat switch is closed.

5. A control apparatus for use with an electrically-operated fluid-fuel burner adapted to fire a space-heating apparatus and with an electrically-operated auxiliary fan for creating a draft through such apparatus, comprising, an energizing circuit for the burner, a switch in said circuit, means including a relay coil closing and opening said switch when energized and deenergized respectively, first and second thermostat switches responsive to the temperature in the space to be heated, the first thermostat switch respectively closing at and opening above a first predetermined temperature, the second thermostat switch respectively closing at and opening above a second and lower predetermined temperature, an energizing circuit for said relay coil including in series both said thermostat switches, whereby the closure of both thermostat switches is necessary to energize said relay coil and close the burner energizing circuit and initiate a cycle of operation of the burner, a second switch closed and opened by said relay coil when energized and deenergized respectively and connected in parallel with the first thermostat switch for maintaining the energizing circuit of said relay coil closed after the opening of the second thermostat switch and until the opening of the first thermostat switch, an energizing circuit for the fan, first and second switches connected in parallel in the fan energizing circuit for closing and opening the latter, means including second and third relay coils one for each of the last-named switches for closing and opening the same when energized and deenergized respectively, a third thermostat switch responsive to combustion at the burner and respectively closing and opening according to the absence or presence of combustion, an energizing circuit for the second relay coil including the first and third thermostat switches, a fourth thermostat switch responsive to combustion at the burner and respectively closing and opening according to the presence or absence of combustion, an energizing circuit for the third relay coil including said fourth thermostat switch, a fifth thermostat switch closing and opening by and with the second thermostat switch, and a shunt circuit including the fifth thermostat switch around the third relay coil for deenergizing the same when said fifth thermostat switch is closed.

JOSEPH A. LOGAN.
JAMES ALAN MACDONNELL.

References Cited in the file of this patent

UNITED STATES PATENTS

| Number | Name | Date |
| --- | --- | --- |
| 1,707,281 | Sauvage | Apr. 2, 1929 |
| 2,086,617 | Hiner | July 13, 1937 |
| 2,162,571 | Bock | June 13, 1939 |
| 2,168,859 | Bergey | Aug. 8, 1939 |
| 2,575,289 | Nycum et al. | Nov. 13, 1951 |